US010332279B2

(12) United States Patent
Cai et al.

(10) Patent No.: US 10,332,279 B2
(45) Date of Patent: Jun. 25, 2019

(54) METHODS AND APPARATUS FOR IMAGE CONSTRUCTION

(71) Applicant: Macau University of Science and Technology, Macau (CN)

(72) Inventors: Zhanchuan Cai, Macau (CN); Ting Lan, Macau (CN)

(73) Assignee: Macau University of Science and Technology, Macau (CN)

( * ) Notice: Subject to any disclaimer, the term of this patent is extended or adjusted under 35 U.S.C. 154(b) by 54 days.

(21) Appl. No.: 15/448,591

(22) Filed: Mar. 3, 2017

(65) Prior Publication Data
US 2018/0253896 A1 Sep. 6, 2018

(51) Int. Cl.
*G06T 15/00* (2011.01)
*G06T 11/00* (2006.01)
*G06T 3/40* (2006.01)

(52) U.S. Cl.
CPC ............ *G06T 11/00* (2013.01); *G06T 3/4007* (2013.01)

(58) Field of Classification Search
CPC ....... G06T 17/30; G06T 17/05; G06T 11/206; G06F 17/17
USPC ........................................................ 345/419
See application file for complete search history.

(56) References Cited

U.S. PATENT DOCUMENTS

| 5,175,808 | A  | * | 12/1992 | Sayre | .................... | G06T 3/0093 |
|---|---|---|---|---|---|---|
|  |  |  |  |  |  | 345/647 |
| 7,091,988 | B2 | * | 8/2006 | Hori | ........................ | G06T 7/246 |
|  |  |  |  |  |  | 345/474 |
| 7,304,649 | B2 | * | 12/2007 | Hori | ........................ | G06T 7/246 |
|  |  |  |  |  |  | 345/619 |
| 9,311,745 | B2 | * | 4/2016 | Andrade | ................. | G06T 17/00 |
| 9,990,334 | B2 | * | 6/2018 | Cai | ......................... | G06T 17/30 |

OTHER PUBLICATIONS

Cai, Z., Lan, T., & Zheng, C. (2017). Hierarchical MK splines: Algorithm and applications to data fitting. IEEE Transactions on Multimedia, 19(5), 921-934.*
Rafael Irizarry, Splines and Friends: Basis Expansion and Regularization; Statistical Learning: Algorithmic and Nonparametric Approaches Rafael Irizarry , Department of Biostatistics, Dana-Farber Cancer Institute, Apr. 18, 2006.*
Borges CF, Pastva T. Total least squares fitting of Bézier and B-spline curves to ordered data. Computer Aided Geometric Design. Apr. 1, 2002;19(4):275-89.*
T. Ogawa, and M. Haseyama, Missing image data reconstruction based on adaptive inverse projection via sparse representation, IEEE Transactions on Multimedia, vol. 13, No. 5, pp. 974-992, 2011.

(Continued)

*Primary Examiner* — Phu K Nguyen
(74) *Attorney, Agent, or Firm* — Eagle IP Limited; Jacqueline C. Lui

(57) ABSTRACT

A method constructs an image with improved peak signal-to-noise ratio (PSNR) from a scattered pixel set. The method generates an approximation function that is a linear combination of a plurality of Many-Knot (MK) spline basis functions, and constructs the image with improved PSNR by conducting a least squares treatment on the approximation function to minimize a residual of each pixel value in the scattered pixel set from the approximation function.

15 Claims, 16 Drawing Sheets

(56) References Cited

OTHER PUBLICATIONS

J. D. Shea, B. D. Van Veen, and S. C Hagness, A TSVD analysis of microwave inverse scattering for breast imaging, IEEE Transactions on Biomedical Engineering, vol. 59, No. 4, pp. 936-945, 2012.

R. Franke, and G. M. Nielson, Scattered data interpolation and applications: A tutorial and survey, in Geometric Modeling: Methods and Applications. Berlin, Heidelberg: Springer Berlin Heidelberg, 1991, pp. 131-160.

R. L. Hardy, Multiquadric equations of topography and other irregular surfaces, Journal of geophysical research, vol. 76, No. 8, pp. 1905-1915, 1971.

J. Nam, and A. H. Tewfik, Detection of gradual transitions in video sequences using B-spline interpolation, IEEE Transactions on Multimedia, vol. 7, No. 4, pp. 667-679, 2005.

N. Almeida, D. Friboulet, S. Sarvari, O. Bernard, D. Barbosa, E. Samset, and J. D'Hooge, Left-atrial segmentation from 3-D ultrasound using B-spline explicit active surfaces with scale uncoupling, IEEE transactions on ultrasonics, ferroelectrics, and frequency control, vol. 63, No. 2, pp. 212-221, 2016.

D. Qi, A class of local explicit many-knot spline interpolation schemes, MRC Technical Summary Report No. 2238, Tech. Rep., 1981.

D.Qi, Matrix representation and estimations of remainder term of many-knot splines interpolation curves and surfaces, Computational Mathematics, vol. 4, No. 3, pp. 244-252, 1982.

H. Li, W. Ding, and D. Qi, Many-knot splines interpolation and multi-scale refinement algorithm, Journal of Image and Graphics, vol. 2, No. 10, pp. 701-706, 1997.

Y. Li, and D. Qi, Least squares method, in Spline Function Method (Collector's Edition). Science Press, 1979, pp. 194-202, ISBN: 9787030464057.

Lee, Seungyong, G. Wolberg, and S. Y. Shin, Scattered Data Interpolation with Multilevel B-Splines, IEEE Transactions on Visualization & Computer Graphics, vol. 3, No. 3, pp. 228-244, 1997.

* cited by examiner

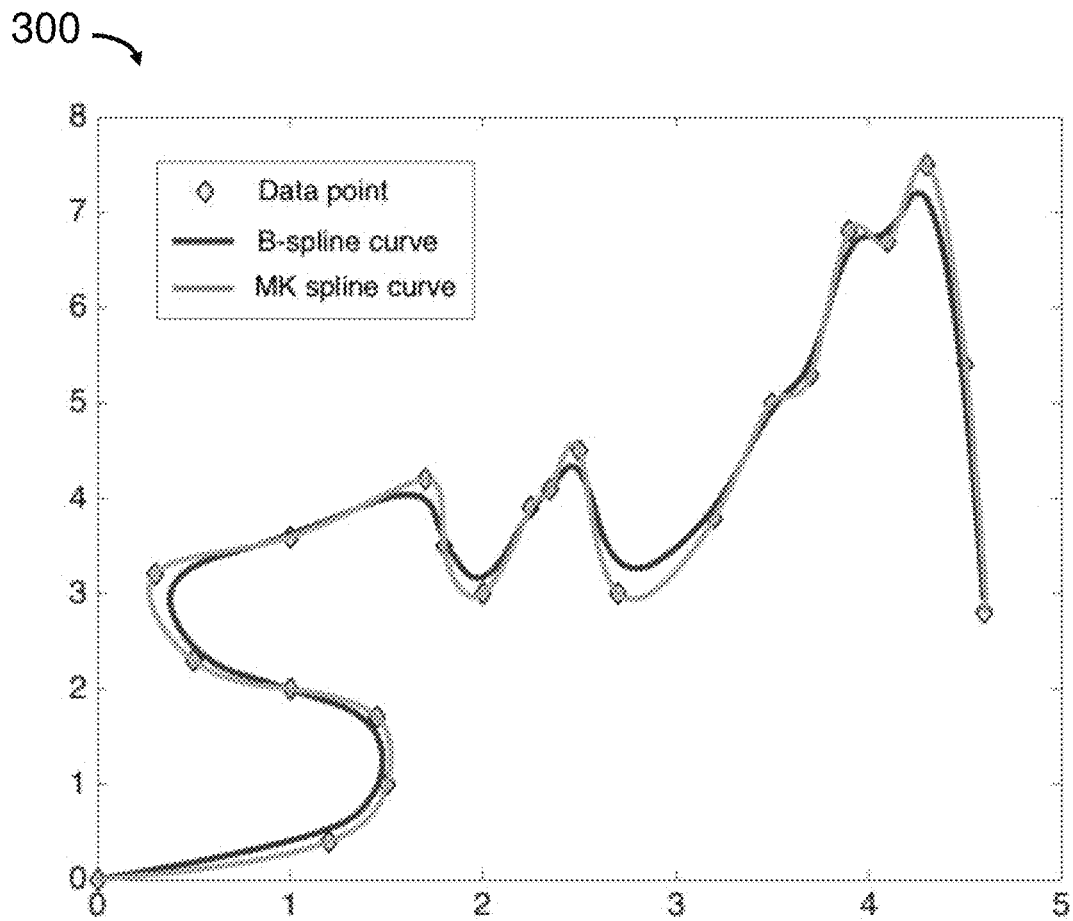

Figure 3

Generating an approximation function that is a linear combination of a plurality of Many-Knot (MK) spline basis functions
410

Constructing an image with improved peak signal-to-noise ratio (*PSNR*) by conducting a least squares treatment on the approximation function to minimize a residual of each pixel value in a scattered pixel set from the approximation function
420

Figure 4

$$\begin{bmatrix} \sum_{j=1}^{N}(L_k(\alpha_j - x_1))^2 & \sum_{j=1}^{N}L_k(\alpha_j - x_1)L_k(\alpha_j - x_2) & \cdots & \sum_{j=1}^{N}L_k(\alpha_j - x_1)L_k(\alpha_j - x_n) \\ \sum_{j=1}^{N}L_k(\alpha_j - x_2)L_k(\alpha_j - x_1) & \sum_{j=1}^{N}(L_k(\alpha_j - x_2))^2 & \cdots & \sum_{j=1}^{N}L_k(\alpha_j - x_2)L_k(\alpha_j - x_n) \\ \vdots & \vdots & \ddots & \vdots \\ \sum_{j=1}^{N}L_k(\alpha_j - x_n)L_k(\alpha_j - x_1) & \sum_{j=1}^{N}L_k(\alpha_j - x_n)L_k(\alpha_j - x_2) & \cdots & \sum_{j=1}^{N}(L_k(\alpha_j - x_n))^2 \end{bmatrix} \cdot \begin{bmatrix} c_1 \\ c_2 \\ \vdots \\ c_n \end{bmatrix}$$

$$= \begin{bmatrix} \sum_{j=1}^{N} L_k(\alpha_j - x_1)\beta_j \\ \sum_{j=1}^{N} L_k(\alpha_j - x_2)\beta_j \\ \vdots \\ \sum_{j=1}^{N} L_k(\alpha_j - x_n)\beta_j \end{bmatrix}$$

| Pseudo Code: MK spline approximation algorithm |
| --- |
| 1: Input: Sample points $(\alpha_j, \beta_j)$ |
| 2: Output: Function of fitting curve: $T(x) = \sum_{i=1}^{n} C_i L_k(x - x_i)$ |
| 3: choose equidistant node locations (uniform partition) |
| 4: divide the interval $[a, b]$ into $p$ equal parts |
| 5: calculate each length $h = \frac{b-a}{p}$ |
| 6: select the MK spline basis function of order $k$ : |
| 7: $\quad L_k(x - x_i) = \sum_\mu \rho_\mu \Omega_k^{(k\mu)}(x - x_i)$ |
| 8: calculate $\Omega_k(x - x_i)$ : |
| 9: $\quad \Omega_k(x - x_i) = \Omega_k(-|x - x_i|) = \frac{1}{k!} \sum_{j=0}^{k+1} (-1)^j C_{k+1}^j (-|x - x_i| + \frac{k+1}{2} - j)_+^k$ |
| 10: calculate $x_i$ : |
| 11: $\quad x_i = a + \frac{(k-1)h}{2} + ih, \quad i = 1, 2, \cdots, n$ |
| 12: for every sample sample points $(\alpha_j, \beta_j)$ do |
| 13: $\quad$ compute the residual expression $\gamma_j$ : |
| 14: $\quad \gamma_j = T(\alpha_j) - \beta_j = \sum_{i=1}^{n} C_i L_k(\alpha_j - x_i) - \beta_j$ |
| 15: end for |
| 16: compute RSS: |
| 17: $\quad R(C_1, C_2, \cdots, C_n) = \sum_{j=1}^{n} \gamma_j^2$ |
| 18: make the minimum $R(C_1, C_2, \cdots, C_n)$ |
| 19: let $\frac{\partial R}{\partial C_j} = 0$ |
| 20: $\quad$ calculate $C_j$ |
| 21: compute the function of fitting curve: $T(x) = \sum_{i=1}^{n} C_i L_k(x - x_i)$ |

$$h \begin{bmatrix} \frac{133}{160} & \frac{221}{1920} & -\frac{31}{960} & \frac{1}{640} & 0 & \cdots & 0 \\ \frac{221}{1920} & \frac{133}{160} & \frac{221}{1920} & -\frac{31}{960} & \frac{1}{640} & \cdots & 0 \\ -\frac{31}{960} & \frac{221}{1920} & \frac{133}{160} & \frac{221}{1920} & -\frac{31}{960} & \cdots & 0 \\ \frac{1}{640} & -\frac{31}{960} & \frac{221}{1920} & \frac{133}{160} & \frac{221}{1920} & \cdots & 0 \\ 0 & \frac{1}{640} & -\frac{31}{960} & \frac{221}{1920} & \frac{133}{160} & \cdots & 0 \\ \vdots & \ddots & \ddots & \ddots & \ddots & \ddots & \vdots \\ 0 & \cdots & 0 & \frac{1}{640} & -\frac{31}{960} & \frac{221}{1920} & \frac{133}{160} \end{bmatrix}.$$

Figure 7

$$h\begin{bmatrix} \frac{74869}{90720} & \frac{89723}{725760} & -\frac{3713}{90720} & \frac{7171}{1451520} & -\frac{17}{60480} & \frac{1}{207360} & 0 & \cdots & 0 \\ \frac{89723}{725760} & \frac{74869}{90720} & \frac{89723}{725760} & -\frac{3713}{90720} & \frac{7171}{1451520} & -\frac{17}{60480} & \frac{1}{207360} & \cdots & 0 \\ -\frac{3713}{90720} & \frac{89723}{725760} & \frac{74869}{90720} & \frac{89723}{725760} & -\frac{3713}{90720} & \frac{7171}{1451520} & -\frac{17}{60480} & \cdots & 0 \\ \frac{7171}{1451520} & -\frac{3713}{90720} & \frac{89723}{725760} & \frac{74869}{90720} & \frac{89723}{725760} & -\frac{3713}{90720} & \frac{7171}{1451520} & \cdots & 0 \\ -\frac{17}{60480} & \frac{7171}{1451520} & -\frac{3713}{90720} & \frac{89723}{725760} & \frac{74869}{90720} & \frac{89723}{725760} & -\frac{3713}{90720} & \cdots & 0 \\ \frac{1}{207360} & -\frac{17}{60480} & \frac{7171}{1451520} & -\frac{3713}{90720} & \frac{89723}{725760} & \frac{74869}{90720} & \frac{89723}{725760} & \cdots & 0 \\ 0 & \frac{1}{207360} & -\frac{17}{60480} & \frac{7171}{1451520} & -\frac{3713}{90720} & \frac{89723}{725760} & \frac{74869}{90720} & \cdots & 0 \\ \vdots & & \ddots & \ddots & \ddots & \ddots & \ddots & \ddots & \vdots \\ 0 & \cdots & 0 & \frac{1}{207360} & -\frac{17}{60480} & \frac{7171}{1451520} & -\frac{3713}{90720} & \frac{89723}{725760} & \frac{74869}{90720} \end{bmatrix}$$

| n | Condition number | |
|---|---|---|
| | MK spline | B-spline |
| 6 | 1.84 | 10.82 |
| 7 | 1.88 | 12.04 |
| 8 | 1.92 | 13.01 |
| ⋮ | ⋮ | ⋮ |
| 18 | 2.02 | 16.69 |
| ⋮ | ⋮ | ⋮ |
| 28 | 2.04 | 17.44 |
| ⋮ | ⋮ | ⋮ |
| 38 | 2.05 | 17.71 |
| ⋮ | ⋮ | ⋮ |

| Hong Kong Observatory | | | | | | | | | | | | |
|---|---|---|---|---|---|---|---|---|---|---|---|---|
| Month | 01 | 02 | 03 | 04 | 05 | 06 | 07 | 08 | 09 | 10 | 11 | 12 |
| Air Temperature – Mean (deg. C) | 16.0 | 15.5 | 17.5 | 23.6 | 26.7 | 29.4 | 29.8 | 28.4 | 27.9 | 26.8 | 22.3 | 19.6 |

1020

1310

1320

METHODS AND APPARATUS FOR IMAGE CONSTRUCTION

FIELD OF THE INVENTION

The present invention generally relates to image processing, and more particularly to methods and apparatus that provide image construction.

BACKGROUND

Image construction is important in a wide variety of fields, such as medical, security, and manufacturing processes. An image is usually constructed or produced from a limited number of scattered sample points. The image as constructed is more satisfactory when there is less deviation or distortion such that objective and truthful information are obtained or reflected from the scattered sample points. Conventional methods and systems employ various schemes (such as basis spline (B-spline) and Lagrange's polynomial interpolation) to conduct image construction. These conventional methods, however, are often inadequate and generate images with low quality.

New methods and apparatus that assist in advancing technological needs and industrial applications in a wide variety of technical field by providing improved image construction are desirable.

SUMMARY OF THE INVENTION

One example embodiment is a method to construct an image with improved peak signal-to-noise ratio (PSNR) from a scattered pixel set. The method generates an approximation function that is a linear combination of a plurality of Many-Knot (MK) spline basis functions, and constructs the image with improved PSNR by conducting a least squares treatment on the approximation function to minimize a residual of each pixel value in the scattered pixel set from the approximation function.

Other example embodiments are discussed herein.

BRIEF DESCRIPTION OF THE DRAWINGS

FIG. 3 shows a graph illustrating a scattered data set, a MK spline curve, and a B-spline curve in accordance with an example embodiment.

FIG. 4 shows a method in accordance with an example embodiment.

FIG. 5 shows a system of equations in accordance with an example embodiment.

FIG. 6 shows an algorithm scheme in accordance with an example embodiment.

FIG. 7 shows a coefficient matrix in accordance with an example embodiment.

FIG. 8 shows a coefficient matrix in accordance with an example embodiment.

FIG. 9 shows a table illustrating comparison between condition numbers for cubic MK spline coefficient matrices and cubic B-spline coefficient matrices in accordance with an example embodiment.

DETAILED DESCRIPTION

Figure 1:
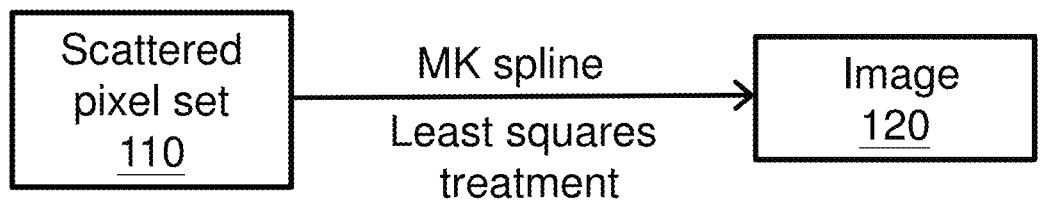
FIG. 1 shows a graph in accordance with an example embodiment.

Example embodiments relate to methods and apparatus that enable image construction with both improved processor performance and improved image quality over conventional methods.

Many existing or conventional methods and/or apparatus construct an image from a scattered or sparse data set or pixel set by using various data interpolation schemes, such as a basis spline (B-spline) method and other methods that involve an interpolation function that is a linear combination of radially symmetric basis functions.

These existing schemes are flawed in a number of aspects. For example, unknown coefficients of the basis functions of an interpolation function or approximation function are usually determined by solving a system of equations. A coefficient matrix that is used to solve these unknown coefficients is often full and becomes poorly conditioned for large data sets. As another example, some schemes such as the B-spline method generates an interpolation curve that cannot pass through each data point in a data set without solving systems of equations, and thus fail to transmit information of data in the data set to all positions in a domain smoothly, which results in an image with unsatisfactory or degraded quality. Furthermore, many systems of equations for existing schemes are ill-conditioned and often lead to unacceptable deviation from original images. In other words, image information constructed from a scattered pixel set is distorted to a large extent. Furthermore, processing of these equations and data can consume large amounts of processing resources and lead to extended processor execution times and a large number of instruction cycles.

Example embodiments solve the above problems and provide technical solutions in new methods and apparatus that operate in unconventional ways to enable image construction with improved performance and with improved quality. Example embodiments employ a least-squares method of many-knot (MK) spline to construct an image with improved peak signal-to-noise ratio (PSNR) from a scattered pixel set or sampled data set including a limited number of sample points. This improvement generates a higher quality image and consumes a smaller amount of processing resources when compared to conventional methods.

For example, example embodiments solve the above problems and provide technical solutions that construct an image by combining a MK spline scheme and a method of least squares (or a least squares treatment). The MK spline scheme enables accurate approximation for the given pixel data or data points in a scattered pixel set without necessity of solving process intensive equations that are usually non-linear and/or ill-conditioned to lead to unacceptable deviation. By contrast, the method of least squares minimizes a residual of each pixel value in the scattered pixel set from an approximation function by solving a linear system of equations that is well-conditioned. Advantages of both the MK spline scheme and the method of least squares are combined or utilized such that information of data is transmitted to the whole image as constructed smoothly and efficiently.

Example embodiments solve the above problems and provide technical solutions that construct an image with reduced processor execution runtime, and thus further benefit computer technology by reducing computational complexity such that images can be processed (e.g., generated and/or constructed) more efficiently from a sampled data set. Example embodiments thus reduce computer resource consumption, such as memory usage and processing time. Example methods can be executed by a computer device or computer system with lower requirements for hardware to perform image processing and thus mitigate demand of costly computers with expensive chips, memory, and other internal electronic components.

FIG. 1 shows a graph in accordance with an example embodiment. For illustrative purpose only, a scattered pixel set 110 is used to construct an image 120. It is not uncommon for a scenario in which only limited information (such as the scattered pixel set 110) is known, and an image is expected or required to be constructed from such limited information to provide more information about the image.

In an example embodiment, the scattered pixel set 110 includes a plurality of sampled data points or sample points with each representing information such as a pixel location and a pixel value. By using a numeral approximation scheme incorporating a MK spline method and a least squares treatment or fitting, the image 120 is obtained with improved quality such as improved PSNR (e.g., improved PSNR when compared to PSNR of conventional methods).

Figure 2A:
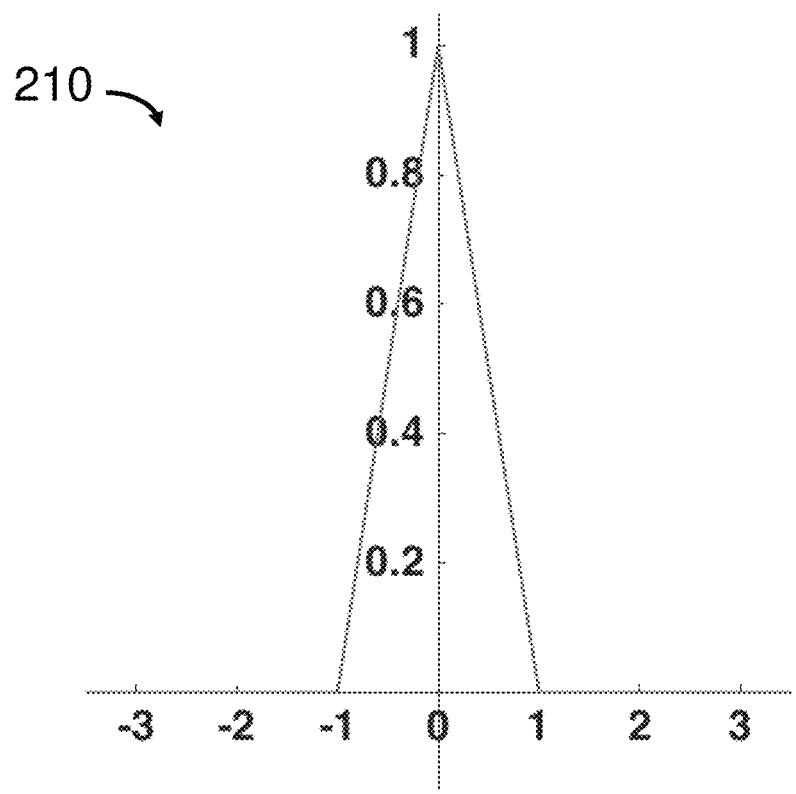
FIG. 2A shows a graph illustrating a linear many-knot (MK) spline basis function in accordance with an example embodiment.
Figure 2B:
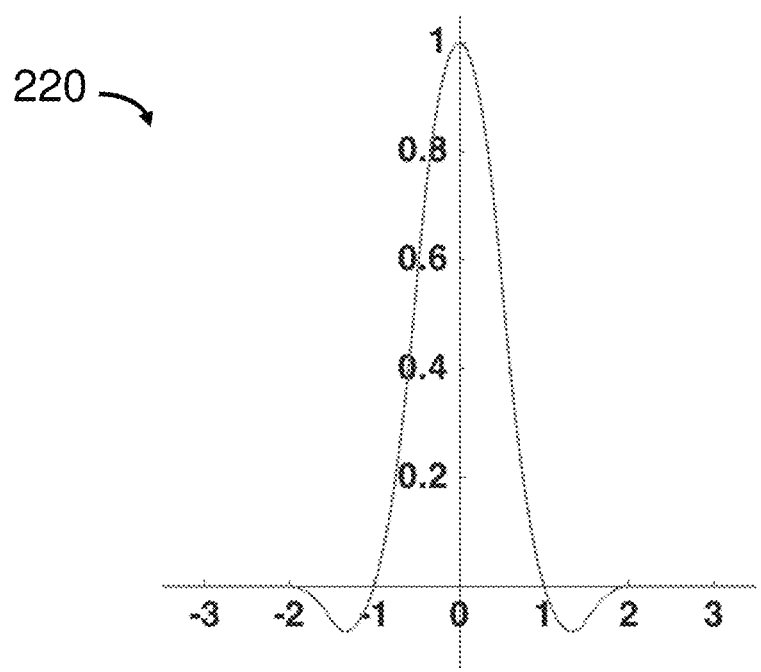
FIG. 2B shows a graph illustrating a quadratic MK spline basis function in accordance with an example embodiment.
Figure 2C:
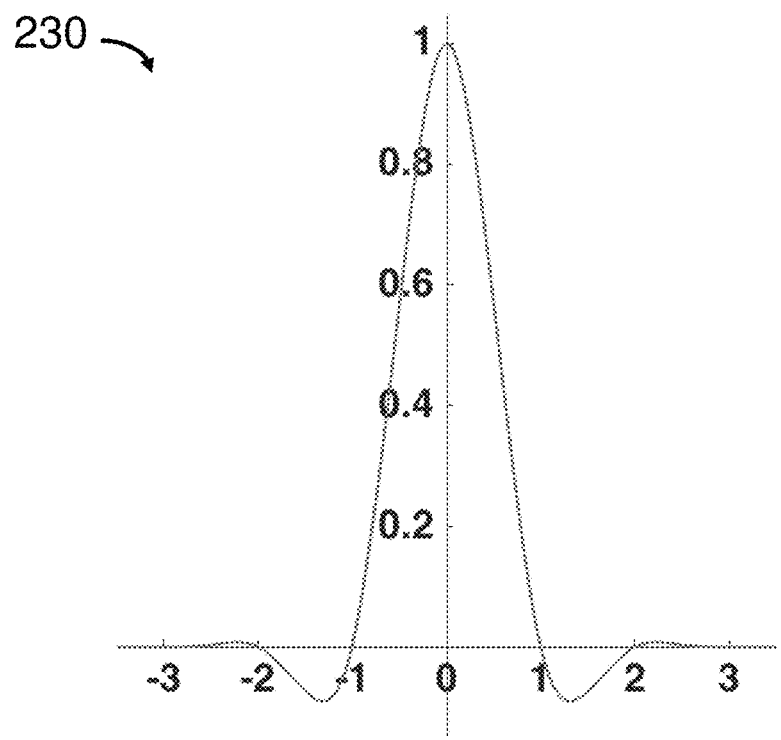
FIG. 2C shows a graph illustrating a cubic MK spline basis function in accordance with an example embodiment.

FIGS. 2A-2C show graphs illustrating MK spline basis functions of order k (k=1,2,3) in accordance with an example embodiment. FIG. 2A shows a graph 210 illustrating a linear MK spline basis function (k=1). FIG. 2B shows a graph 220 illustrating a quadratic MK spline basis function (k=2). FIG. 2C shows a graph 230 illustrating a cubic MK spline basis function (k=3).

By way of example, a MK spline basis function can be expressed as a linear combination of B-spline basis functions. For example, a MK spline basis function of order k is expressed as:

$$L_k(t) = \sum_\mu p_\mu \Omega_k^{(\xi_\mu)}(t) \quad (1)$$

where $p_\mu$ ($\mu=0,1,\ldots,k-1$) are undetermined constants or coefficients. $\Omega_k(t)$ is a B-spline basis function of order k and satisfies:

$$\Omega_k(x) = \Omega_k(-|x|) \quad (2)$$
$$= \frac{1}{k!} \sum_{j=0}^{k+1} (-1)^j C_{k+1}^j \left(-|x| + \frac{k+1}{2} - j\right)_+^k,$$
$$k = 0, 1, 2, 3, \cdots;$$
$$(\cdot)_+ = \max\{\cdot, 0\}.$$

where $$C_{k+1}^j = \frac{(k+1)!}{(k+1-j)! \times j!},$$

j! is factorial of j, namely j!=j×(j−1) . . . × 1, and $\Omega_k^{(\xi_\mu)}(t)$ satisfies the following equation:

$$\Omega_k^{(\xi_\mu)}(t) = \frac{1}{2}[\Omega_k(t+\xi_\mu) + \Omega_k(t-\xi_\mu)] \quad (3)$$

where $\xi_\mu$ is a given constant.

By way of example, for k=0 and 1, $L_0(t)=\Omega_0(t)$, $L_1(t)=\Omega_1(t)$. For k>1, in order to construct $L_k(t)$, let $L_0(t)=1$, $L_k(i)=0$, m≠0, where i is a non-zero integer. Then the linear equations of $p_i$ (i=0, 1, . . . , k−1) can be obtained. A MK spline basis function of order k (i.e. $L_k(t)$) can be calculated by solving one or more linear equations.

By way of example, for k=2, let $\xi_0=0$, $\xi_1=0$, then $L_2(t)$ is computed as follows:

$$L_2(t) = 2\Omega_2^{(0)}(t) - \Omega_2^{(\frac{1}{2})}(t) \quad (4)$$

By way of example, for k=3, let $\xi_0=0$, $\xi_1=\frac{1}{2}$, $\xi_2=1$ then $L_3(t)$ is computed as follows:

$$L_3(t) = \frac{10}{3}\Omega_3^{(0)}(t) - \frac{8}{3}\Omega_3^{(\frac{1}{2})}(t) + \frac{1}{12}\Omega_3^{(1)}(t) \quad (5)$$

where $\Omega_2^{(0)}(t)=\Omega_2(t)$, $\Omega_3^{(0)}(t)=\Omega_3(t)$.

FIG. 3 shows a graph 300 illustrating a scattered data set or pixel set, a MK spline curve, and a B-spline curve in accordance with an example embodiment. As shown, the scatted data set includes a plurality of sparse data points or sampled points. Data interpolation by using MK spline or B-spline scheme attempts to construct a curve or image to restore or recover all information in a domain.

MK spline basis functions are explicit, and B-spline basis functions are inexplicit for regularly sampled data. Without solving systems of equations, a B-spline curve does not pass through all the given data points, while a MK spline curve passes through all the given data points, as illustrated in FIG. 3. Thus, the MK spline scheme is advantageous over the B-spline scheme in constructing new data points within a range of a discrete set of known data points.

FIG. 4 shows a method in accordance with an example method. The example method constructs an image with improved PSNR from a scattered pixel set.

By way of example, PSNR is used to evaluate quality difference between an original image and an image that is constructed or derived from a scattered pixel set. For example, a larger PSNR indicates the image as constructed resembles an original image more closely or less deviation between constructed information and actual information for an image, which indicates the image construction scheme shows better performance and is more favorable. By way of example, PSNR is defined as:

$$PSNR = 10 \times \log_{10}\left(\frac{M \times N \times 255^2}{\sum_{i=1}^{M}\sum_{j=1}^{N}[I(i,j) - K(i,j)]^2}\right)$$

where the size of images is M×N, and the original image is represented as I, the image that is constructed from a scattered pixel set is represented as K.

Example methods as illustrated can be executed by a computer that incorporates software, hardware, and combinations of hardware and software. The computer includes electronic devices such as a computer system or electronic system, wearable electronic devices, servers, portable electronic devices, handheld portable electronic devices, and hardware (e.g., a processor, processing unit, digital signal processor, microprocessor, microcontroller, controller, application specific integrated circuit (ASIC), field programmable gate arrays (FPGAs), etc.).

According to block 410, an approximation function is generated as a linear combination of a plurality of Many-Knot (MK) spline basis functions.

By way of example, there are N sample points ($\alpha j$, $\beta j$) in a scattered pixel set or sampled data set, where $\alpha j$ is in an interval [a, b], $\beta j$ is in an interval [a', b'], j=1,2, ..., N. An approximation function T(x) is generated as a linear combination of MK spline basis functions as follows:

$$T(x) = \sum_{i=1}^{n} C_i L_k(x - x_i) \tag{6}$$

where $x_i$ represents an i-th given node in the interval [a, b], and N is much larger than n. $L_k(.)$ is a MK spline basis function of order k. In an example embodiment, N is equal to 100, and n is less than 10, i.e., the value of N is 10 times greater than the value of n.

According to block 420, the image is constructed with improved PSNR by conducting a least squares treatment on the approximation function to minimize a residual of each pixel value in the scattered pixel set from the approximation function.

For illustrative purpose only, equidistant node locations (i.e. uniform partition) are adopted, and thus the interval [a, b] is divided into p equal parts or subintervals. Each partition step or length for the interval [a, b] is $$h = \frac{b - a}{p}.$$

All subintervals have the same basis functions by using the MK spline basis functions of order k. Let n=p−k, the following expression for the i-th given node $x_i$ is obtained as:

$$x_i = a + \frac{(k-1)h}{2} + ih, \quad i = 1, 2, \ldots, n. \tag{7}$$

A residual or residua expression for each pixel or sample point in the scattered pixel set is obtained as:

$$\gamma_j = T(\alpha_j) - \beta_j = \sum_{i=1}^{n} C_i L_k(\alpha_j - x_i) - \beta_j. \tag{8}$$

Then a residual sum of squares (RSS) (expressed as $R(C_1, C_2, \ldots, C_n)$) is obtained as:

$$R(C_1, C_2, \ldots, C_n) = \sum_{i=1}^{n} \gamma_j^2. \tag{9}$$

The least-squares fitting scheme is to minimize RSS, namely to minimize $R(C_1, C_2, \ldots, C_n)$ by determining n coefficients Ci, which is achieved by:

$$\frac{\partial R}{\partial C_j} = 0, \quad j = 1, 2, \ldots, n. \tag{10}$$

A matrix form (i.e. equation (11)) of equation (10) is illustratively shown as a graph 500 in FIG. 5. An example algorithm is shown as a graph 600 in FIG. 6.

A person of ordinary skill in the art would appreciate that the above example, which is one-dimensional and uses uniform partition, is for convenience only in order to illustrate concept of the example method. For example, a person of ordinary skill in the art would appreciate variations and modifications that involve n-dimensional (n>1) and employ non-uniform partition for one or more intervals in a domain.

By way of example, the equation (11), which is shown in FIG. 5 at 510, is a linear system of equations AR=F, where A is a coefficient matrix. $A=(\alpha_{ij})_{n \times n}$, $\alpha_{ij}=<\varphi_i, \varphi_j>$, i,j=1,2, n, where $<\cdot, \cdot>$ represents a dot product (or inner product), $\{\varphi_i(x)\}$ is a linearly independent set of functions on the interval [a, b]. The matrices R and F are shown as 520 and 530 in FIG. 5. $R=(C_1, C_2, \ldots, C_n)^T$ and $F=(F_1, F_2, \ldots, F_n)^T$, $F_i=<\varphi_i, f>$, i=1,2, ..., n. As shown in FIG. 5, the coefficient matrix A in equation (11) is a symmetric band matrix that can be efficiently solved with reduced processor execution time.

In an example embodiment, to solve a coefficient matrix, let $$\varphi_i(x) = \Omega_k\left(\frac{x - x_i}{h}\right),$$

with equations (2) and (12), $a_{i,j}=<\varphi_i, \varphi_j>=\int_a^b \varphi_i(x)\varphi_j(x)dx$ is computed as follows:

$$a_{ij} = h\Omega_{2k+1}\left(\frac{x_i - x_j}{h}\right) = h\Omega_{2k+1}(|i-j|), \quad i, j = 1, 2, \ldots, n. \quad (12)$$

By way of example, a linearly independent set of functions is chosen as:

$$\varphi_i(x) = L_k\left(\frac{x-x_i}{h}\right) = \sum_\mu \rho_\mu \Omega_k^{(\xi_\mu)}\left(\frac{x-x_i}{h}\right). \quad (13)$$

where $L_k(t)$ is a MK spline basis function of order k as stated above, and $\Omega_k(t)$ is a B-spline basis function of order k as stated above.

Then $a_{i,j}$ is calculated as:

$$a_{ij} = \left\langle L_k\left(\frac{x-x_i}{h}\right), L_k\left(\frac{x-x_j}{h}\right)\right\rangle$$
$$= \int_{-\infty}^{\infty} \sum_\mu \rho_\mu \Omega_k^{(\xi_\mu)}\left(\frac{x-x_i}{h}\right) \sum_\nu \rho_\nu \Omega_k^{(\xi_\nu)}\left(\frac{x-x_j}{h}\right) dx$$
$$= \int_{-\infty}^{\infty} \sum_{\mu,\nu} \rho_\mu \rho_\nu \Omega_k^{(\xi_\mu)}\left(\frac{x-x_i}{h}\right) \Omega_k^{(\xi_\nu)}\left(\frac{x-x_j}{h}\right) dx$$

According to equations (3) and (12), $\alpha_{i,j}$ is obtained as:

$$a_{ij} = h\sum_{\mu,\nu} \rho_\mu \rho_\nu [\Omega_{2k+1}(i-j-\xi_\mu+\xi_\nu) + \Omega_{2k+1}(i-j+\xi_\mu+\xi_\nu) + \quad (14)$$
$$\Omega_{2k+1}(i-j-\xi_\mu-\xi_\nu) + \Omega_{2k+1}(i-j+\xi_\mu-\xi_\nu)].$$

By way of example, for k=0, with equation (13), $\varphi_i(x)$ is obtained as:

$$\varphi_i(x) = L_0\left(\frac{x-x_i}{h}\right) = \Omega_0\left(\frac{x-x_i}{h}\right)$$

So $\alpha_{ij} = h\Omega_1(|i-j|) = \alpha_{ji}$ and the coefficient matrix A is a symmetric band matrix hI, where I is an identity matrix or with ones on a main diagonal and zeros elsewhere.

By way of example, for k=1, with equation (13), $\varphi_i(x)$ is obtained as:

$$\varphi_i(x) = L_1\left(\frac{x-x_i}{h}\right) - \Omega_1\left(\frac{x-x_i}{h}\right).$$

So $\alpha_{ij} = h\Omega_3(|i-j|) = \alpha_{ji}$ and the coefficient matrix A is a symmetric band matrix as:

$$h\begin{bmatrix} \frac{2}{3} & \frac{1}{6} & 0 & \cdots & 0 \\ \frac{1}{6} & \frac{2}{3} & \frac{1}{6} & \cdots & 0 \\ 0 & \frac{1}{6} & \frac{2}{3} & \cdots & 0 \\ \vdots & \ddots & \ddots & \ddots & \vdots \\ 0 & \cdots & 0 & \frac{1}{6} & \frac{2}{3} \end{bmatrix}.$$

By way of example, for k=2, with equations (4) and (13), $\varphi_i(x)$ is obtained as:

$$\varphi_i(x) = L_2\left(\frac{x-x_i}{h}\right)$$
$$= 2\Omega_2^{(0)}\left(\frac{x-x_i}{h}\right) - \Omega_2^{(\frac{1}{2})}\left(\frac{x-x_i}{h}\right).$$

Then, with equation (14), $\alpha_{ij}$ is obtained as:

$$a_{ij} = \left\langle L_2\left(\frac{x-x_i}{h}\right), L_2\left(\frac{x-x_j}{h}\right)\right\rangle$$
$$= \left\langle \Omega_2\left(\frac{x-x_i}{h}\right), \Omega_2\left(\frac{x-x_j}{h}\right)\right\rangle - \left\langle \Omega_2^{(\frac{1}{2})}\left(\frac{x-x_i}{h}\right), \Omega_2\left(\frac{x-x_j}{h}\right)\right\rangle -$$
$$\left\langle \Omega_2\left(\frac{x-x_i}{h}\right), \Omega_2^{(\frac{1}{2})}\left(\frac{x-x_j}{h}\right)\right\rangle + \frac{1}{4}\left\langle \Omega_2^{(\frac{1}{2})}\left(\frac{x-x_i}{h}\right), \Omega_2^{(\frac{1}{2})}\left(\frac{x-x_j}{h}\right)\right\rangle$$
$$= 4\Omega_5(|i-j|) - \Omega_5\left(\left|i-j-\frac{1}{2}\right|\right) - \Omega_5\left(\left|i-j+\frac{1}{2}\right|\right) -$$
$$\Omega_5\left(\left|i-j-\frac{1}{2}\right|\right) - \Omega_5\left(\left|i-j+\frac{1}{2}\right|\right) +$$
$$\frac{1}{4}[\Omega_5(|i-j+1|) + 2\Omega_5(|i-j|) + \Omega_5(|i-j-1|)].$$

According to equation (2), it is obtained:

$$\Omega_5(0) = \frac{66}{120}, \quad \Omega_5\left(\frac{1}{2}\right) = \Omega_5\left(-\frac{1}{2}\right) = \frac{1682}{3840},$$
$$\Omega_5(1) = \Omega_5(-1)\frac{26}{120}, \quad \Omega_5\left(\frac{3}{2}\right) = \Omega_3\left(-\frac{1}{2}\right) = \frac{237}{3840},$$
$$\Omega_5(2) = \Omega_5(-2)\frac{1}{120}, \quad \Omega_5\left(\frac{5}{2}\right) = \Omega_5\left(-\frac{5}{2}\right) = \frac{1}{3840}.$$

So the coefficient matrix A is a symmetric band matrix shown as the graph 700 in FIG. 7.

By way of example, for k=3, with equations (4) and (13), $\varphi_i(x)$ is obtained as:

$$\varphi_i(x) = L_3\left(\frac{x-x_i}{h}\right)$$
$$= \frac{10}{3}\Omega_3^{(0)}\left(\frac{x-x_i}{h}\right) - \frac{8}{3}\Omega_3^{(\frac{1}{2})}\left(\frac{x-x_i}{h}\right) + \frac{1}{12}\Omega_3^{(1)}\left(\frac{x-x_i}{h}\right).$$

Then, with equations (14), $\alpha_{ij}$ is obtained as:

$$a_{ij} = \left\langle L_3\left(\frac{x-x_i}{h}\right), L_3\left(\frac{x-x_j}{h}\right)\right\rangle$$
$$= \frac{100}{9}\left\langle \Omega_3\left(\frac{x-x_i}{h}\right), \Omega_3\left(\frac{x-x_j}{h}\right)\right\rangle - \frac{40}{9}\left\langle \Omega_3^{(\frac{1}{2})}\left(\frac{x-x_i}{h}\right), \Omega_3\left(\frac{x-x_j}{h}\right)\right\rangle +$$
$$\frac{5}{9}\left\langle \Omega_3^{(1)}\left(\frac{x-x_i}{h}\right), \Omega_3\left(\frac{x-x_j}{h}\right)\right\rangle + \frac{5}{9}\left\langle \Omega_3\left(\frac{x-x_i}{h}\right), \Omega_3^{(1)}\left(\frac{x-x_j}{h}\right)\right\rangle +$$
$$\frac{1}{36}\left\langle \Omega_3^{(1)}\left(\frac{x-x_i}{h}\right), \Omega_3^{(1)}\left(\frac{x-x_j}{h}\right)\right\rangle - \frac{40}{9}\left\langle \Omega_3\left(\frac{x-x_i}{h}\right), \Omega_3^{(\frac{1}{2})}\left(\frac{x-x_j}{h}\right)\right\rangle -$$
$$\frac{2}{9}\left\langle \Omega_3^{(\frac{1}{2})}\left(\frac{x-x_i}{h}\right), \Omega_3^{(1)}\left(\frac{x-x_j}{h}\right)\right\rangle - \frac{2}{9}\left\langle \Omega_3^{(1)}\left(\frac{x-x_i}{h}\right), \Omega_3^{(\frac{1}{2})}\left(\frac{x-x_j}{h}\right)\right\rangle +$$
$$\frac{16}{9}\left\langle \Omega_3^{(\frac{1}{2})}\left(\frac{x-x_i}{h}\right), \Omega_3^{(\frac{1}{2})}\left(\frac{x-x_j}{h}\right)\right\rangle$$

-continued $$= \frac{265}{18}\Omega_7(|i-j|) - \frac{28}{3}\Omega_7^{(\frac{1}{2})}(|i-j|) + \frac{26}{9}\Omega_7^{(1)}(|i-j|) -$$

$$\frac{4}{9}\Omega_7^{(\frac{3}{2})}(|i-j|) + \frac{1}{36}\Omega_7^{(2)}(|i-j|).$$

According to equation (2), the following values are calculated:

$$\Omega_7(0) = \frac{2416}{5040}, \Omega_7\left(\frac{1}{2}\right) = \Omega_7\left(-\frac{1}{2}\right) = \frac{259723}{645120},$$

$$\Omega_7(1) = \Omega_7(-1)\frac{1191}{5040}, \Omega_7\left(\frac{3}{2}\right) = \Omega_7\left(-\frac{3}{2}\right) = \frac{60657}{645120},$$

$$\Omega_7(2) = \Omega_7(-2)\frac{120}{5040}, \Omega_7\left(\frac{5}{2}\right) = \Omega_7\left(-\frac{5}{2}\right) = \frac{2179}{645120},$$

$$\Omega_7(3) = \Omega_7(-3)\frac{1}{5040}, \Omega_7\left(\frac{7}{2}\right) = \Omega_7\left(-\frac{7}{2}\right) = \frac{1}{645120}.$$

So the coefficient matrix A is a symmetric band matrix shown as equation (15) in a graph 800 in FIG. 8.

As illustratively shown in some example embodiments, the coefficient matrix A of a MK spline scheme combined with a least-squares fitting method is a band matrix. By way of example, when k=0,1,2,3, a linearly independent sets of functions is selected as MK spline basis functions of order k as shown by equation (13).

The first four condition numbers of the coefficient matrix A are obtained as:

$$cond(A) = \begin{cases} = 1, & k = 0; \\ \leq 3, & k = 1; \\ \leq \frac{271}{128}, & k = 2; \\ \leq \frac{422721}{176231}, & k = 3 \end{cases}$$

This is illustrated in an example embodiment in which according to the Gershgorin circle theorem, $$|\lambda - a_{ii}| \leq r_i \leq r_{max} = \sum_{j=1, j\neq i}^{n} |a_{ij}|, \quad i = 1, 2, \ldots, n$$

where $\lambda$ represents an eigenvalue of the coefficient matrix A, $\alpha_{ij}$ represents the elements of A, and r is the radius of an disc.

For k=0, it can be obtained that cond(A)=1.

For k=1, $r_i \leq r_{max} = \frac{1}{6} \times 2 = \frac{1}{3}$ and $\frac{1}{3} \leq \lambda \leq 1$, the condition number is:

$$cond(A) \leq \left|\frac{\lambda_{max}}{\lambda_{min}}\right| = 3.$$

For k=2, $$r_i \leq r_{max} = \left(\frac{221}{1920} + \frac{31}{960} + \frac{1}{640}\right) \times 2 = \frac{148}{480} \text{ and}$$

$$\frac{256}{480} \leq \lambda \leq \frac{542}{480},$$

the condition number is:

$$cond(A) \leq \left|\frac{\lambda_{max}}{\lambda_{min}}\right| = \frac{271}{128}.$$

For k=3, $r_i \leq r_{max} = 6161/18144$, the condition number is:

$$cond(A) \leq \left|\frac{\lambda_{max}}{\lambda_{min}}\right| = \frac{422721}{176231}.$$

FIG. 9 is a table 900 illustrating comparison between condition numbers for cubic MK spline coefficient matrices and cubic B-spline coefficient matrices in accordance with an example embodiment. For illustrative purpose, a coefficient matrix is expressed as $A=(\alpha_{ij})_{n\times n}$.

A condition number of a function with respect to an argument measures how much the output value of the function can change for a small change in the input argument. For example, this is used to measure how sensitive a function is to changes or errors in the input, and how much error in the output results from an error in the input. For many scenario, a small condition number is generally expected.

In the table 900 n is in a range between 6 and 38. Condition numbers for n=6, 7, 8, 18, 28 and 38 are shown for illustrative purpose. The condition numbers for cubic MK spline coefficient matrices are in a range between 1.84 and 2.05, while the condition numbers for cubic B-spline coefficient matrices are in a range between 10.82 and 17.71.

As shown, the condition numbers of a cubic MK spline coefficient matrix remains stable and does not change much with the increasing of n. By contrast, the condition numbers of a cubic B-spline coefficient matrix does not remain stable with the increasing of n. The condition numbers of cubic MK spline are better than the condition numbers of cubic B-spline because the coefficient matrix of cubic B-spline has ill-conditioned feature and the coefficient matrix of cubic MK spline has relatively well-conditioned feature.

In an example embodiment, p=9, N=100. The interval [a, b] is [0, 9], and the interval [a', b'] is [0,9], and h=1.

For a cubic MK spline, AR=F has the following form:

$$A_{MK}^{(3)} R_{MK} = F_{MK} \quad (16)$$

where $A_{MK}^{(3)}$ is obtained from the matrix (15) as shown in FIG. 8. $F_{MK}$ is calculated as:

$$F_{MK} = [-8.3202, 74.1100, 232.9196, 111.4484, -10.6057, 0.7888]^T.$$

$R_{MK}$ is calculated by solving a system of equations (16) as:

$$R_{MK} = [-9.2387 \times 10^{-5}, 0.0012, 0.0030, 0.0016, -5.5865 \times 10^{-5}, -5.6558 \times 10^{-5}]^T.$$

As an example, when there is a noise, $F_{MK}(6)=0.7888$ is amplified by 1.1 times and becomes 0.8676. A new $R'_{MK}$ is obtained. Then the rate of change $RC_{MK}$ (with cubic MK spline as an example) is:

$$RC_{MK} = \frac{|R_{MK} - R'_{MK}|}{|R_{MK}|} = \begin{bmatrix} 1.9198 \times 10^{-6}, 2.0689 \times 10^{-6}, 13520 \times 10^{-9}, \\ 2.9551 \times 10^{-5}, 0.0024, 0.0159 \end{bmatrix}^T.$$

By contrast, for the cubic B-spline, AR=F has the following form:

$$A_B^{(3)} R_B F_B \quad (17)$$

where $A_B^{(3)}$ is a coefficient matrix of cubic B-spline based on the least-squares method. $F_B$ is calculated by the least-squares method. To calculate the rate of change $RC_B$ (with cubic B-spline as an example), $F_B$ is calculated first. Next, $R_B$ is obtained by solving the system of equations (17). Then $F_B(6)$ is amplified by 1.1 times. After that, $R'_B$ is obtained. Finally, the rate of change RCB is calculated as:

$$RC_B = [0.0250, 0.0250, 0.0250, 0.0222, 0.0062, 0.0273]^T.$$

The value of $RC_B$ is larger than the value of $RC_{MK}$, which indicates that the impact of noise on cubic B-spline is greater than that on cubic MK spline. Thus, the example method incorporating MK spline and least squares treatment is superior to existing B-spline method.

Figures 10A, 10B:
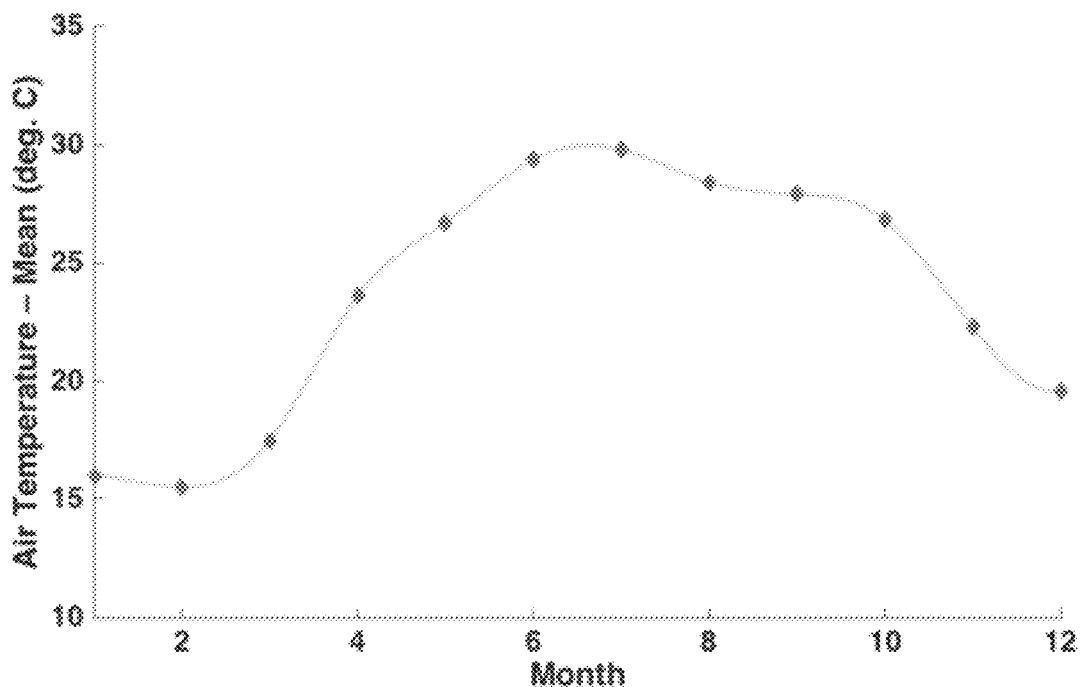
FIG. 10A shows a table illustrating air temperature in Hong Kong in accordance with an example embodiment.
FIG. 10B shows a graph illustrating an image constructed in accordance with an example embodiment.

FIGS. 10A-10B show an image construction scheme in accordance with an example embodiment. FIG. 10A is a table 1010 showing air temperature in Hong Kong. By way of example, the table 1010 shows average monthly temperature in the year 2016 in Hong Kong. FIG. 10B shows a graph 1020 illustrating an image or curve constructed by using one or more example methods as stated herein. As shown, the curve as constructed runs smoothly and passes through each temperature data point.

Figure 11A:
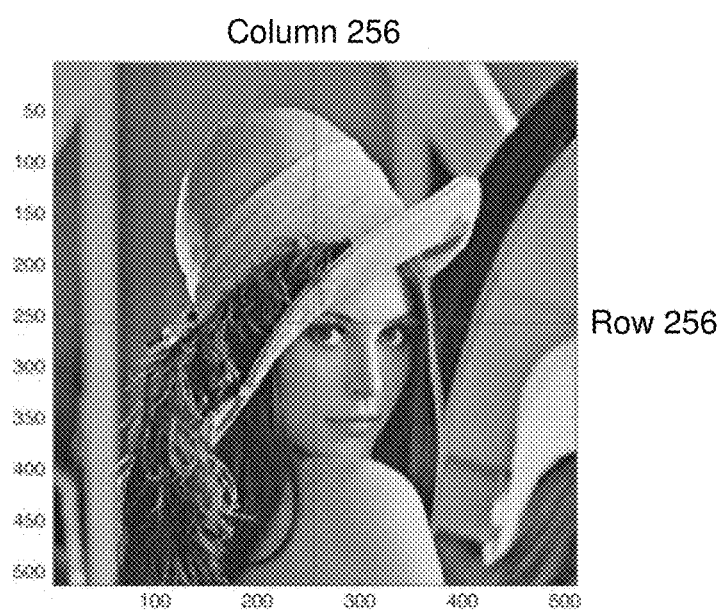
FIG. 11A shows a grayscale Lena image in accordance with an example embodiment.
Figure 11B:
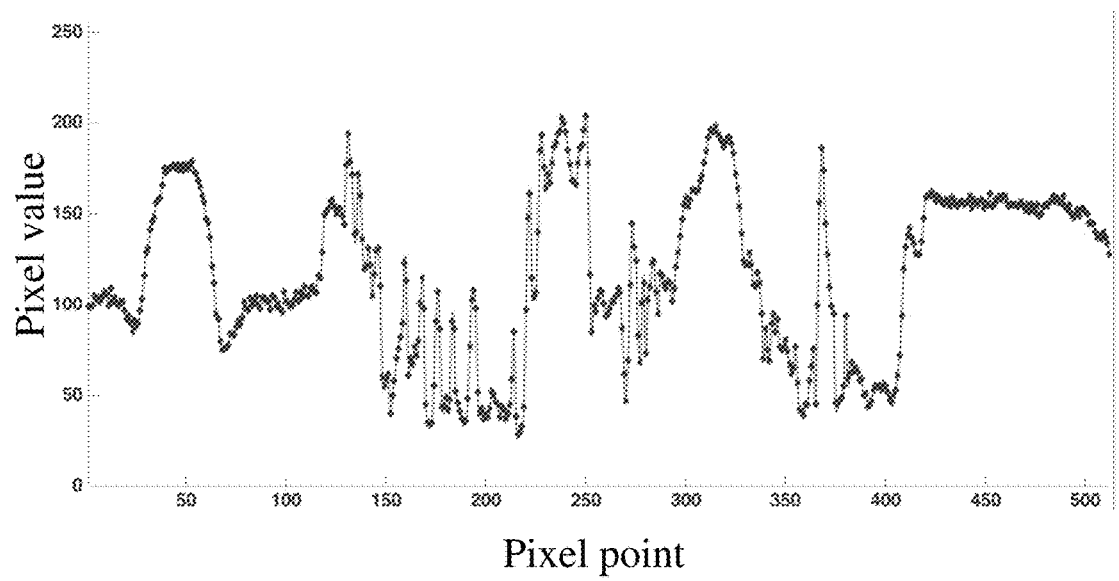
FIG. 11B shows a graph illustrating an image constructed from pixels in the row 256 in accordance with an example embodiment.
Figure 11C:
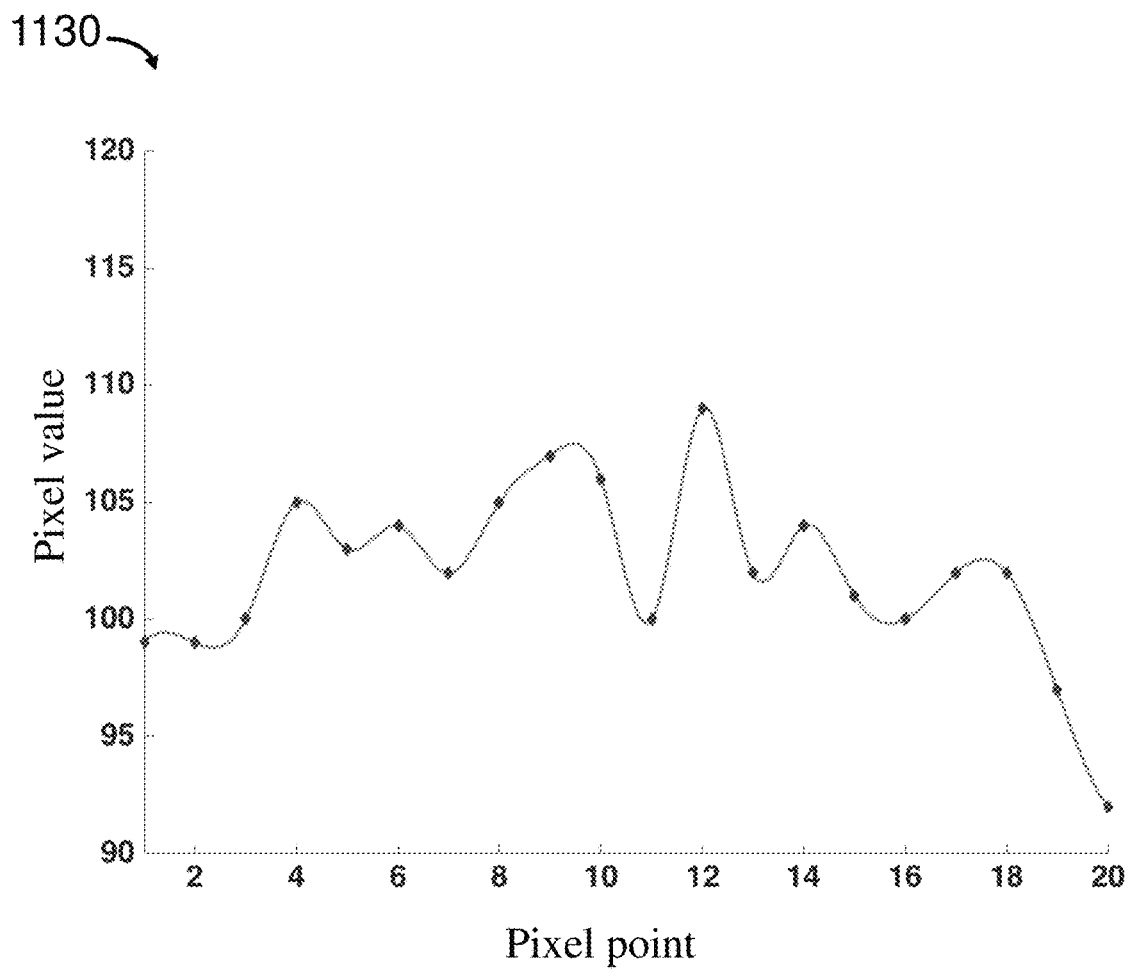
FIG. 11C shows a graph illustrating an image constructed from the first 20 pixels in the row 256 in accordance with an example embodiment.
Figure 11D:
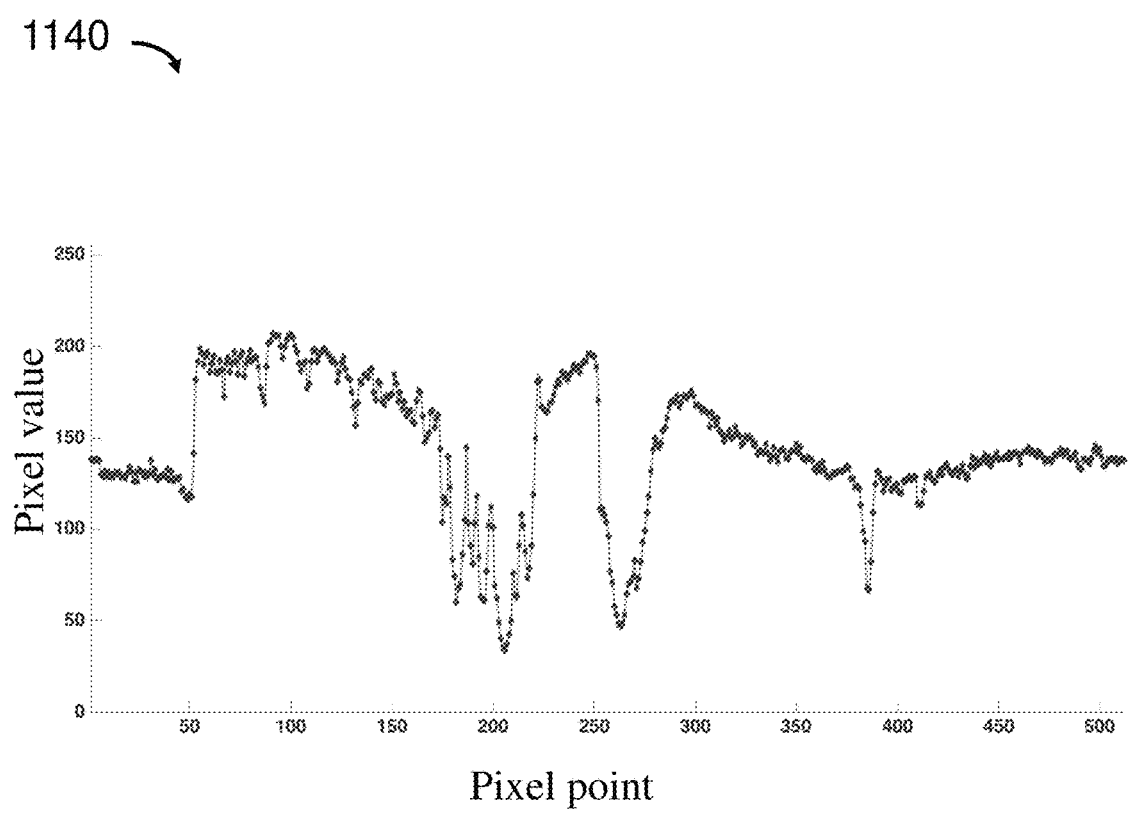
FIG. 11D shows a graph illustrating an image constructed from pixels in the column 256 in accordance with an example embodiment.
Figure 11E:
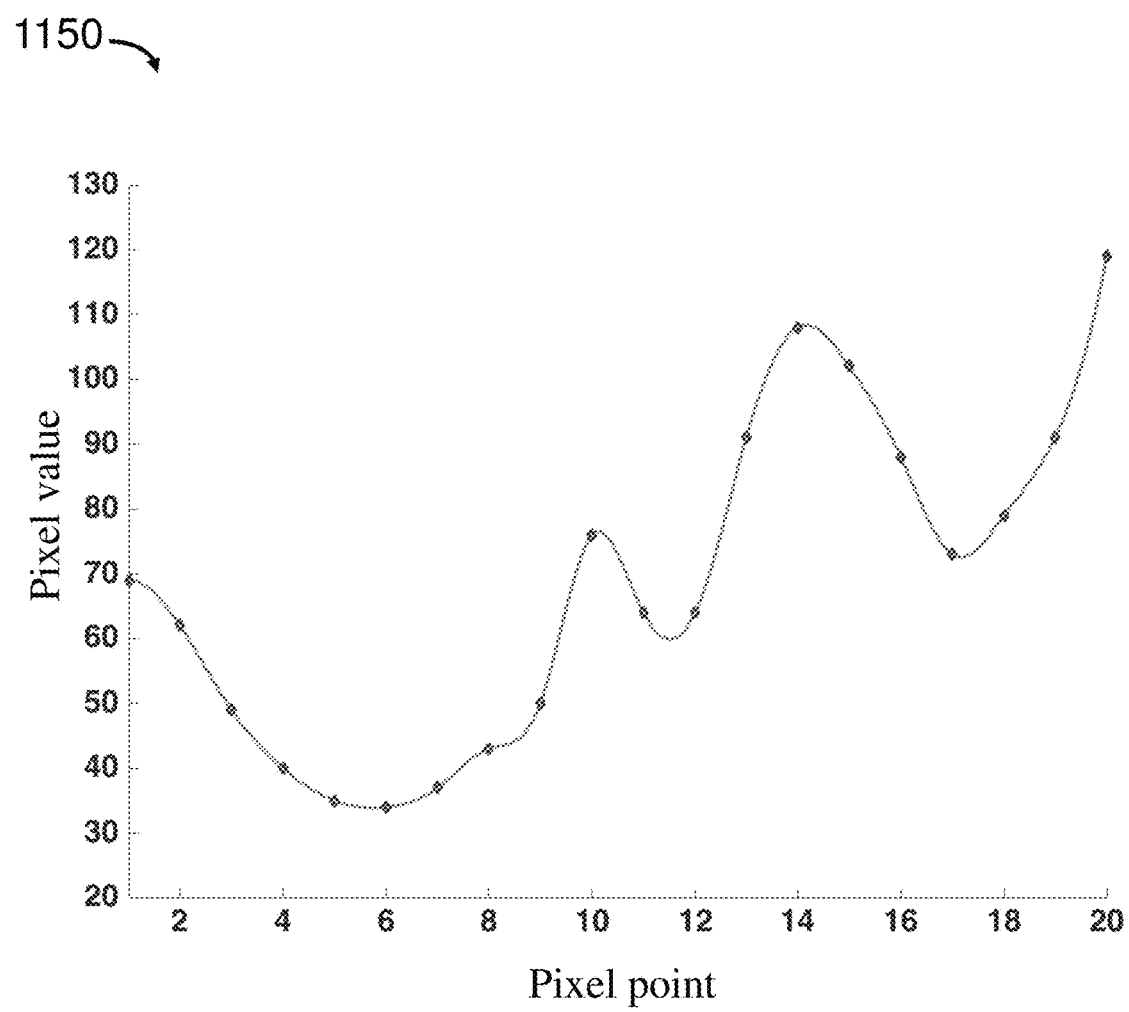
FIG. 11E shows a graph illustrating an image constructed from the first 20 pixels in the column 256 in accordance with an example embodiment.

FIGS. 11A-11E show an image construction scheme in accordance with an example embodiment. For illustrative purpose, FIG. 11A shows a grayscale Lena image 1110 with 512×512 pixels. FIG. 11B shows a graph 1120 illustrating an image or curve constructed from pixels in the row 256 (or the 256$^{th}$ row) by using one or more example methods as stated herein. FIG. 11C shows a graph 1130 illustrating an image or curve constructed from the first 20 pixels in the row 256 by using one or more example methods as stated herein. FIG. 11D shows a graph 1140 illustrating an image or curve constructed from pixels in the column 256 (or the 256$^{th}$ column) by using one or more example methods as stated herein. FIG. 11E shows a graph 1150 illustrating an image or curve constructed from the first 20 pixels in the column 256 by using one or more example methods as stated herein. In FIGS. 11B-11E, the scattered points represent sampled pixel data, and the curves are constructed from corresponding scattered pixel data. As shown, the curve as constructed runs smoothly and passes through each pixel point as a basis for the construction.

Figure 12A:
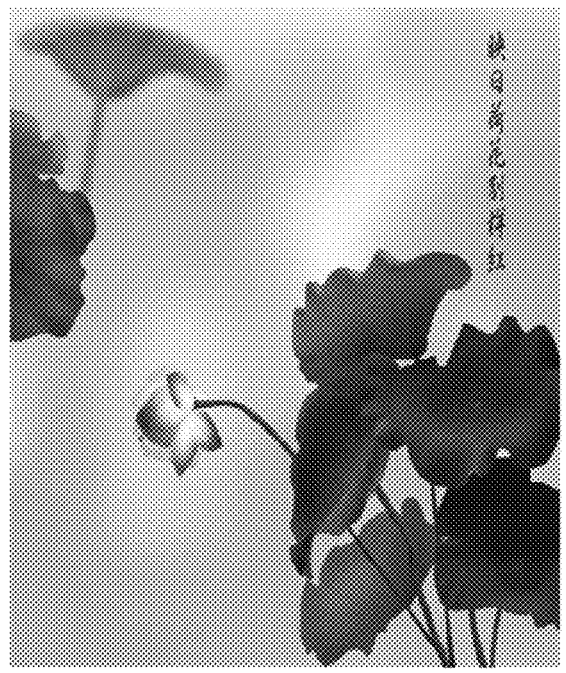
FIG. 12A shows an original flower image in accordance with an example embodiment.
Figure 12B:
FIG. 12B shows a graph illustrating a scattered pixel set on which is based to construct a flower image in accordance with an example embodiment.

FIG. 12A shows an original flower image 1210 in accordance with an example embodiment. FIG. 12B shows a graph 1220 illustrating a scattered pixel set or sampled pixels on which is based to construct a flower image in accordance with an example embodiment.

By way of example, to construct or recover an image from a plurality of scattered or non-uniform samples, a grayscale image is chosen as a surface and the value of each pixel indicates height of the surface. In this manner, image construction is considered as a surface fitting problem for interpolation data points that can be solved by an approximation function.

For illustrative purpose, the original flower image 1210 includes 321×385 pixels. The number of sample points or pixels in FIG. 12B is 23627 where the edge includes 10314 sample points. Other sample points are randomly sampled from the image.

For purpose of comparison, image construction is conducted by using one or more example methods herein and an existing B-spline method respectively. When the approximation function is based on cubic B-spline basis function, the PSNR of a flower image as constructed is 28.71. When the approximation function is based on cubic MK spline basis function in conjunction with a least square treatment in accordance with one or more example methods, the PSNR of a flower image as constructed is 37.62. Larger PSNR indicates better performance for image construction from a scattered pixel set in accordance with example embodiments.

Figure 13A:
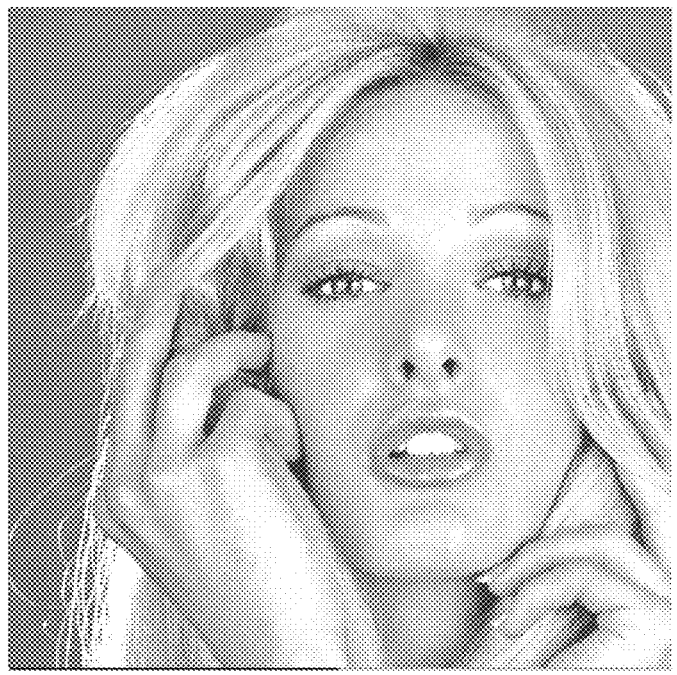
FIG. 13A shows an original human image in accordance with an example embodiment.
Figure 13B:
FIG. 13B shows a graph illustrating a scattered pixel set on which is based to construct a human image in accordance with an example embodiment.

FIG. 13A shows an original human image 1310 in accordance with an example embodiment. FIG. 13B shows a graph 1320 illustrating scattered pixel set or sampled pixels on which is based to construct a human image in accordance with an example embodiment.

For illustrative purpose, the original human image 1310 includes 513×513 pixels. The number of sample points or pixels in FIG. 13B is 62534 where the edge includes 35840 sample points. Other sample points are randomly sampled from the image.

For purpose of comparison, image construction is conducted by using one or more example methods herein and an existing B-spline method respectively. When the approximation function is based on cubic B-spline basis function, the PSNR of a human image as constructed is 28.74. When the approximation function is based on cubic MK spline basis function in conjunction with a least square treatment in accordance with one or more example methods, the PSNR of a human image as constructed is 33.24. Larger PSNR indicates better performance for image construction from a scattered pixel set in accordance with example embodiments.

Regarding processor execution time or runtime, in an example embodiment, the processor execution time is compared between one or more example embodiments and an existing method as stated by Lee, Seungyong, G. Wolberg, and S. Y. Shin in "Scattered Data Interpolation with Multi-level B-Splines," IEEE Transactions on Visualization & Computer Graphics, vol. 3, no.3, pp. 228-244, 1997 (called Lee hereinafter).

Lee uses a cubic B-spline approximation function that is a combination of multiple B-spline approximation functions. Given 1000 scattered data points as an example. Each image construction is conducted for ten times to acquire an average runtime or running time.

The average runtime is 0.1073 seconds when the approximation function is based on cubic MK basis function in accordance with one or more example methods as stated herein (m=n=8, Matlab 2015b and 2.7 GHz Core i5 with 8 GB memory). By contrast, the average runtime is 0.1509 seconds when the approximation function is based on cubic B-spline basis function in accordance with Lee (m=n=8, Matlab 2015b and 2.7 GHz Core i5 with 8 GB memory). The meaning of m and n is detailed in Lee's reference.

Thus, example embodiments construct an image with reduced processor execution runtime over existing methods, and thus are more efficient and require less computer resource.

Figure 14:
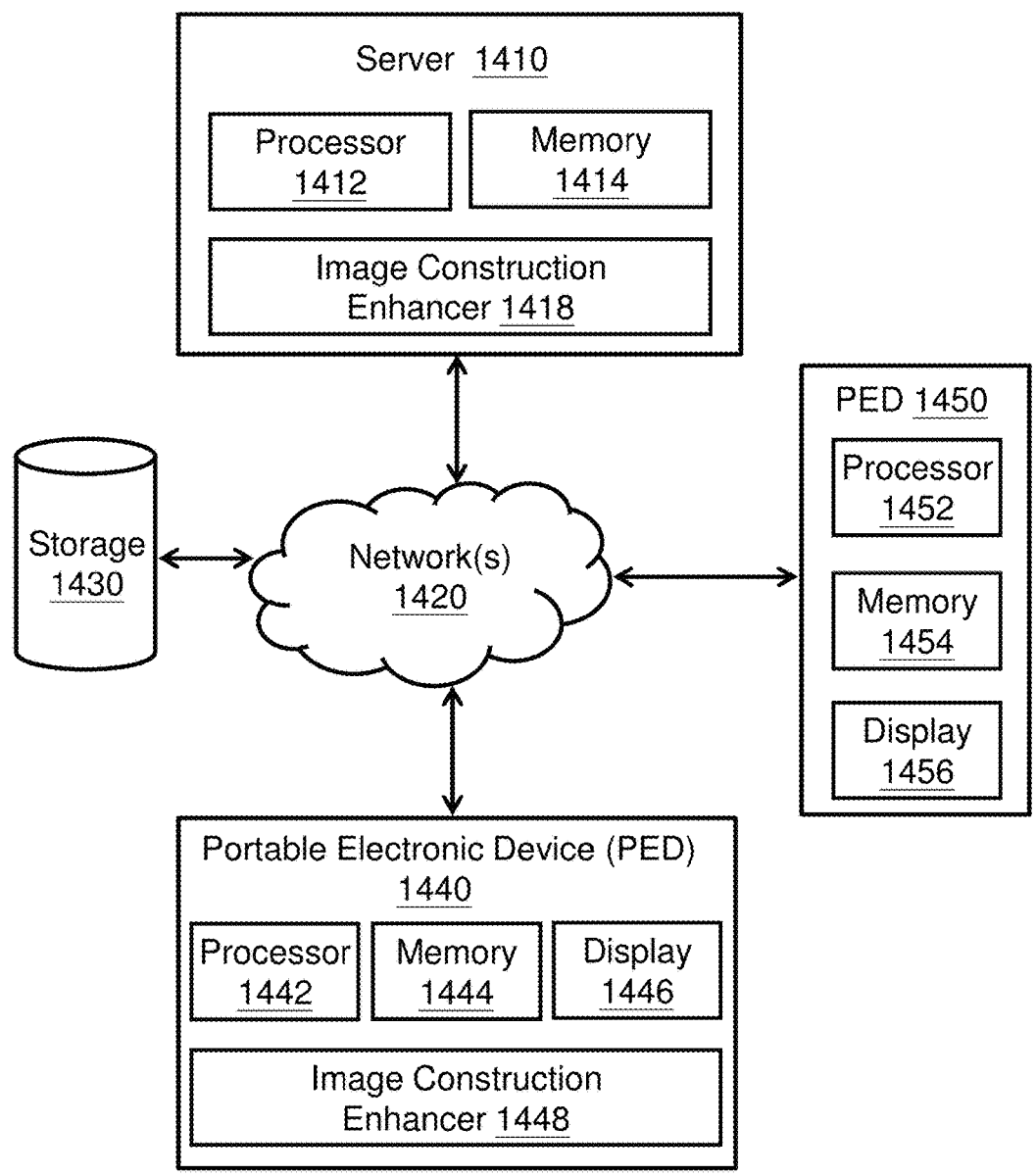
FIG. 14 shows a computer system in accordance with an example embodiment.

FIG. 14 shows a computer system or electronic system in accordance with an example embodiment. The computer system 1400 includes one or more computers or electronic devices (such as one or more servers) 1410 that includes a processor or processing unit 1412 (such as one or more processors, microprocessors, and/or microcontrollers), one or more components of computer readable medium (CRM) or memory 1414, and an image construction enhancer 1418.

The memory 1414 stores instructions that when executed cause the processor 1412 to execute a method discussed herein and/or one or more blocks discussed herein. The image construction enhancer 1418 is example of specialized hardware and/or software that assist in improving performance of a computer and/or execution of a method discussed herein and/or one or more blocks discussed herein. Example functions of an image construction enhancer are discussed in connection with FIG. 4.

In an example embodiment, the computer system 1400 includes a storage or memory 1430, a portable electronic device or PED 1440 in communication over one or more networks 1420.

The storage 1430 can include one or more of memory or databases that store one or more of image files, audio files, video files, software applications, and other information discussed herein. By way of example, the storage 1430 store image, instructions or software application that are retrieved by the server 1410 over the network 1420 such that a method discussed herein and/or one or more blocks discussed herein are executed.

The PED 1440 includes a processor or processing unit 1442 (such as one or more processors, microprocessors, and/or microcontrollers), one or more components of computer readable medium (CRM) or memory 1444, one or more displays 1446, and an image construction enhancer 1448.

The PED 1440 can execute a method discussed herein and/or one or more blocks discussed herein and display an image (such as a watermark image, a host image, and a watermarked image) for review. Alternatively or additionally, the PED 1440 can retrieve files such as images and software instructions from the storage 1430 over the network 1320 and execute a method discussed herein and/or one or more blocks discussed herein.

In an example embodiment, the computer system 1400 includes a PED 1450 that includes a processor or processing unit 1452 (such as one or more processors, microprocessors, and/or microcontrollers), one or more components of computer readable medium (CRM) or memory 1454, and one or more displays 1456.

By way of example, the PED 1450 communicates with the server 1410 and/or the storage 1430 over the network 1420 such that a method discussed herein and/or one or more blocks discussed herein is executed by the server 1410 and results are sent back to the PED 1450 for output, storage and review.

The network 1420 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed a processor, controller, and other hardware discussed herein. Furthermore, blocks and/or methods discussed herein can be executed automatically with or without instruction from a user.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, an "image" is an article or artifact that depicts visual perception, for example a two-dimensional picture or curve or video image, that has a similar appearance to some subject (such as a physical object or a person), thus providing a depiction of it. For example, an image may include a plurality of pixels with each corresponding to a pixel value.

As used herein, "image construction" refer to a process to construct or recover an image from a scattered pixel set or data set to obtain the image. The date set includes a plurality of sample points that represent partial information of an image.

As used herein, a "system of equations" is a collection of two or more equations with a same set of unknowns.

As used herein, a "condition number" of a function with respect to an argument measures how much the output value of the function can change for a small change in the input argument. A problem with a low condition number is said to be well-conditioned, while a problem with a high condition number is said to be ill-conditioned.

As used herein, a set of functions $f_1(x), f_2(x), \ldots, f_n(x)$ is said to be linearly independent if none of the functions in the set can be expressed as a linear combination of any other functions of the set.

As used herein, a "band matrix" is a sparse matrix whose non-zero entries are confined to a diagonal band, comprising the main diagonal and zero or more diagonals on either side.

As used herein, a "symmetric band matrix" is a symmetric matrix whose nonzero elements are arranged uniformly near the diagonal, such that $\alpha_{ij}=0$ if $|i-j|>k$, where k is the half band width.

As used herein, an "identity matrix" of size n is an n×n square matrix with ones on the main diagonal and zeros elsewhere.

What is claimed is:

1. A computer-implemented method to construct an image with improved peak signal-to-noise ratio (PSNR) from a scattered pixel set, the method comprising:
    generating, by a computer system, an approximation function that is a linear combination of a plurality of Many-Knot (MK) spline basis functions;
    providing each of the plurality of MK spline basis functions as an MK spline basis function of order k (k=0,1,2,3);
    constructing, by the computer system, the image with improved PSNR by conducting a least squares treatment on the approximation function to minimize a residual of each pixel value in the scattered pixel set from the approximation function;
    improving, by the computer system, construction of the image from the scattered pixel set by solving a linear system of equations in which a coefficient matrix A is a symmetric band matrix; and
    obtaining, by the computer system, the image by solving the linear system of equations to obtain the coefficient matrix A that has a condition number cond(A) as:

$$cond(A) = \begin{cases} =1, & k=0 \\ \leq 3, & k=1 \\ \leq \frac{271}{128}, & k=2 \\ \leq \frac{422721}{176231}, & k=3 \end{cases}.$$

2. The method of claim 1, further comprising:
    improving, by the computer system, construction of the image from the scattered pixel set by generating the approximation function in a form of:

$$T(x) = \sum_{i=1}^{n} C_i L_k(x - x_i)$$

where T(x) is the approximation function with x as an variable representing a location of a pixel in the scattered pixel set, i is an index, n is a number of MK spline basis functions, $x_i$ is a i-th given node, $L_k C$ is a MK spline basis function of order k, and $c_i$ is a coefficient of $L_k(x-x_i)$.

3. The method of claim 1, further comprising:
    providing each of the plurality of MK spline basis functions as an MK spline basis function of order zero; and
    obtaining, by the computer system, the image by solving a linear system of equations to obtain a coefficient matrix as hI where h is a partition step, 1 is an identity matrix with ones on a main diagonal and zeros elsewhere.

4. The method of claim 1, further comprising:
    providing each of the plurality of MK spline basis functions as an MK spline basis function of order one; and
    obtaining, by the computer system, the image by solving a linear system of equations to obtain a coefficient matrix as:

$$h \begin{bmatrix} \frac{2}{3} & \frac{1}{6} & 0 & \cdots & 0 \\ \frac{1}{6} & \frac{2}{3} & \frac{1}{6} & \cdots & 0 \\ 0 & \frac{1}{6} & \frac{2}{3} & \cdots & 0 \\ \vdots & \ddots & \ddots & \ddots & \vdots \\ 0 & \cdots & 0 & \frac{1}{6} & \frac{2}{3} \end{bmatrix}.$$

where h is a partition step.

5. The method of claim 1, further comprising:
    providing each of the plurality of MK spline basis functions as an MK spline basis function of order two; and
    obtaining, by the computer system, the image by solving a linear system of equations to obtain a coefficient matrix as:

$$h \begin{bmatrix} \frac{133}{160} & \frac{221}{1920} & -\frac{31}{960} & \frac{1}{640} & 0 & \cdots & 0 \\ \frac{221}{1920} & \frac{133}{160} & \frac{221}{1920} & -\frac{31}{960} & \frac{1}{640} & \cdots & 0 \\ -\frac{31}{960} & \frac{221}{1920} & \frac{133}{160} & \frac{221}{1920} & -\frac{31}{960} & \cdots & 0 \\ \frac{1}{640} & -\frac{31}{960} & \frac{221}{1920} & \frac{133}{160} & \frac{221}{1920} & \cdots & 0 \\ 0 & \frac{1}{640} & -\frac{31}{960} & \frac{221}{1920} & \frac{133}{160} & \cdots & 0 \\ \vdots & \ddots & \ddots & \ddots & \ddots & \ddots & \vdots \\ 0 & \cdots & 0 & \frac{1}{640} & -\frac{31}{960} & \frac{221}{1920} & \frac{133}{160} \end{bmatrix}.$$

where h is a partition step.

6. The method of claim 1, further comprising:
    providing each of the plurality of MK spline basis functions as an MK spline basis function of order three; and
    obtaining, by the computer system, the image by solving a linear system of equations to obtain a coefficient matrix as:

$$h\begin{bmatrix} \frac{74869}{90720} & \frac{89723}{725760} & -\frac{3713}{90720} & \frac{7171}{1451520} & \frac{17}{60480} & \frac{1}{207360} & 0 & \cdots & 0 \\ \frac{89723}{725760} & \frac{74869}{90720} & \frac{89723}{725760} & -\frac{3713}{90720} & \frac{7171}{1451520} & -\frac{17}{60480} & \frac{1}{207360} & \cdots & 0 \\ -\frac{3713}{90720} & \frac{89723}{725760} & \frac{74869}{90720} & \frac{89723}{725760} & -\frac{3713}{90720} & \frac{7171}{1451520} & -\frac{17}{60480} & \cdots & 0 \\ \frac{7171}{1451520} & -\frac{3713}{90720} & \frac{89723}{725760} & \frac{74869}{90720} & \frac{89723}{725760} & -\frac{3713}{90720} & \frac{7171}{1451520} & \cdots & 0 \\ -\frac{17}{60480} & \frac{7171}{1451520} & -\frac{3713}{90720} & \frac{89723}{725760} & \frac{74869}{90720} & \frac{89723}{725760} & -\frac{3713}{90720} & \cdots & 0 \\ \frac{1}{207360} & -\frac{17}{60480} & \frac{7171}{1451520} & -\frac{3713}{90720} & \frac{89723}{725760} & \frac{74869}{90720} & \frac{89723}{725760} & \cdots & 0 \\ 0 & \frac{1}{207360} & -\frac{17}{60480} & \frac{7171}{1451520} & -\frac{3713}{90720} & \frac{89723}{725760} & \frac{74869}{90720} & \cdots & 0 \\ \vdots & \ddots & \ddots & \ddots & \ddots & \ddots & \ddots & \ddots & \vdots \\ 0 & \cdots & 0 & \frac{1}{207360} & -\frac{17}{60480} & \frac{7171}{1451520} & -\frac{3713}{90720} & \frac{89723}{725760} & \frac{74869}{90720} \end{bmatrix}$$

where h is a partition step.

7. A computer system to construct an image with improved peak signal-to-noise ratio (PSNR), the computer system comprising:
   a processor;
   a display; and
   a non-transitory computer-readable storage medium having stored thereon instructions that when executed cause the processor to:
      generate an approximation function that is a linear combination of a plurality of Many-Knot (MK) spline basis functions;
      generate each of the plurality of MK spline basis functions as an MK spline basis function of order k (k=0, 1, 2, 3);
      reduce execution time of the processor to construct the image by conducting a least squares fitting on the approximation function to minimize a residual of each pixel value in the scattered pixel set from the approximation function;
      improve construction of the image from the scattered pixel set by solving a linear system of equations in which a coefficient matrix A is a symmetric band matrix;
      obtain the image by solving the linear system of equations to obtain the coefficient matrix A that has a condition number cond(A) as:

$$cond(A) = \begin{cases} = 1, & k=0 \\ \leq 3, & k=1 \\ \leq \frac{271}{128}, & k=2 \\ \leq \frac{422721}{176231}, & k=3 \end{cases}$$

and
   display the image on the display.

8. The computer system of claim 7, wherein the approximation function has a form of $$T(x) = \sum_{i=1}^{n} C_i L_k(x - x_i)$$

where T(x) is the approximation function with x as an variable representing a location of a pixel in the scattered pixel set, i is an index, n is a number of MK spline basis functions, $x_i$ is an i-th given node, $L_k C$ is a MK spline basis function of order k, and $c_i$ is a coefficient of $L_k(x-x_i)$.

9. The computer system of claim 7, wherein the instructions that when executed further cause the processor to:
   generate each of the plurality of MK spline basis functions as a MK spline basis function of order zero; and
   obtain the image by solving a linear system of equations to obtain a coefficient matrix as hI where h is a partition step, 1 is an identity matrix with ones on main diagonals and zeros elsewhere.

10. The computer system of claim 7, wherein the instructions that when executed further cause the processor to:
   generate each of the plurality of MK spline basis functions as an MK spline basis function of order one; and
   obtain the image by solving a linear system of equations to obtain a coefficient matrix as:

$$h\begin{bmatrix} \frac{2}{3} & \frac{1}{6} & 0 & \cdots & 0 \\ \frac{1}{6} & \frac{2}{3} & \frac{1}{6} & \cdots & 0 \\ 0 & \frac{1}{6} & \frac{2}{3} & \cdots & 0 \\ \vdots & \ddots & \ddots & \ddots & \vdots \\ 0 & \cdots & 0 & \frac{1}{6} & \frac{2}{3} \end{bmatrix}.$$

where h is a partition step.

11. The computer system of claim 7, wherein the instructions that when executed further cause the processor to:
   generate each of the plurality of MK spline basis functions as an MK spline basis function of order two; and
   obtain the image by solving a linear system of equations to obtain a coefficient matrix as:

$$h\begin{bmatrix} \frac{133}{160} & \frac{221}{1920} & -\frac{31}{960} & \frac{1}{640} & 0 & \cdots & 0 \\ \frac{221}{1920} & \frac{133}{160} & \frac{221}{1920} & -\frac{31}{960} & \frac{1}{640} & \cdots & 0 \\ -\frac{31}{960} & \frac{221}{1920} & \frac{133}{160} & \frac{221}{1920} & -\frac{31}{960} & \cdots & 0 \\ \frac{1}{640} & -\frac{31}{960} & \frac{221}{1920} & \frac{133}{160} & \frac{221}{1920} & \cdots & 0 \\ 0 & \frac{1}{640} & -\frac{31}{960} & \frac{221}{1920} & \frac{133}{160} & \cdots & 0 \\ \vdots & \ddots & \ddots & \ddots & \ddots & \ddots & \vdots \\ 0 & \cdots & 0 & \frac{1}{640} & -\frac{31}{960} & \frac{221}{1920} & \frac{133}{160} \end{bmatrix}.$$

where h is a partition step.

12. The computer system of claim 7, wherein the instructions that when executed further cause the processor to:
generate each of the plurality of MK spline basis functions as a MK spline basis function of order three; and
obtain the image by solving a linear system of equations to obtain a coefficient matrix as:

$$h\begin{bmatrix} \frac{74869}{90720} & \frac{89723}{725760} & -\frac{3713}{90720} & \frac{7171}{1451520} & \frac{17}{60480} & \frac{1}{207360} & 0 & \cdots & 0 \\ \frac{89723}{725760} & \frac{74869}{90720} & \frac{89723}{725760} & -\frac{3713}{90720} & \frac{7171}{1451520} & \frac{17}{60480} & \frac{1}{207360} & \cdots & 0 \\ -\frac{3713}{90720} & \frac{89723}{725760} & \frac{74869}{90720} & \frac{89723}{725760} & -\frac{3713}{90720} & \frac{7171}{1451520} & \frac{17}{60480} & \cdots & 0 \\ \frac{7171}{1451520} & -\frac{3713}{90720} & \frac{89723}{725760} & \frac{74869}{90720} & \frac{89723}{725760} & -\frac{3713}{90720} & \frac{7171}{1451520} & \cdots & 0 \\ -\frac{17}{60480} & \frac{7171}{1451520} & -\frac{3713}{90720} & \frac{89723}{725760} & \frac{74869}{90720} & \frac{89723}{725760} & -\frac{3713}{90720} & \cdots & 0 \\ \frac{1}{207360} & -\frac{17}{60480} & \frac{7171}{1451520} & -\frac{3713}{90720} & \frac{89723}{725760} & \frac{74869}{90720} & \frac{89723}{725760} & \cdots & 0 \\ 0 & \frac{1}{207360} & -\frac{17}{60480} & \frac{7171}{1451520} & -\frac{3713}{90720} & \frac{89723}{725760} & \frac{74869}{90720} & \cdots & 0 \\ \vdots & \ddots & \ddots & \ddots & \ddots & \ddots & \ddots & \ddots & \vdots \\ 0 & \cdots & 0 & \frac{1}{207360} & -\frac{17}{60480} & \frac{7171}{1451520} & -\frac{3713}{90720} & \frac{89723}{725760} & \frac{74869}{90720} \end{bmatrix}$$

where h is a partition step.

13. A method executed by a computer system to display an image that is constructed with reduced processor execution time from a sampled data set including a plurality of sample points, the method comprising:
generating, by a processor in the computer system, an approximation function that is a linear combination of a plurality of Many-Knot (MK) spline basis functions;
constructing, by the processor in the computer system, the image with the reduced processor execution time by conducting a least squares treatment on the approximation function to solve a linear system of equations in which a coefficient matrix is a symmetric band matrix to obtain the image; and
displaying, on a display of the computer system, the image,
wherein each of the plurality of MK spline basis functions is an MK spline basis function of order three, and a condition number for the symmetric band coefficient matrix is in a range between 1.84 and 2.05.

14. The method of claim 13, further comprising:
generating, by the computer system, the approximation function having a form of $$T(x) = \sum_{i=1}^{n} C_i L_k(x - x_i)$$

where T(x) is the approximation function with x as an variable representing a location of a pixel in the sampled data set, i is an index, n is a number of MK spline basis functions, $x_i$, is an i-th given node, $L_k C$ is a MK spline basis function of order k, and $c_i$ is a coefficient of $L_k(x-x_i)$;

creating, by the computer system and for each sample point $(\alpha_j, \beta_j)$ in the sampled data set, a residual expression $\gamma_j$ as:

$$\gamma_j = T(\alpha_j) - \beta_j = \sum_{i=1}^{n} C_i L_k(\alpha_j - x_i) - \beta_j;$$

creating, by the computer system and for each sample point $(\alpha_j, \beta_j)$ in the sampled data set, a residual sum of squares as:

$$R(C_1, C_2 < \ldots, C_n) = \sum_{i=1}^{n} \gamma_j^2;$$

and obtaining, by the computer system, the image by minimizing a residual sum of squares by solving the linear system of equations:

$$\frac{\partial R}{\partial C_j} = 0, \, j = 1, 2, \ldots, n.$$

15. The method of claim 13, further comprising:
reducing, by the computer system, the processor execution time of constructing the image by solving the linear system of equations to obtain a symmetric band coefficient matrix, wherein the symmetric band coefficient matrix is a n×n matrix.

* * * * *